– – – – –

United States Patent [19]
Horiie et al.

[11] 3,947,536
[45] Mar. 30, 1976

[54] PROCESS FOR PREPARING A FILM OF A TAPERED COPOLYMER OF STYRENE-BUTADIENE OR MIXTURES THEREOF

[75] Inventors: Shigeki Horiie, Yokohama; Susumu Kurematsu, Zama; Shinichiro Asai, Machida; Chiaki Saito, Tokyo, all of Japan

[73] Assignee: Denki Kagaku Kogyo K.K., Tokyo, Japan

[22] Filed: Apr. 17, 1974

[21] Appl. No.: 461,644

Related U.S. Application Data

[63] Continuation-in-part of Ser. No. 294,832, Oct. 4, 1972, Pat. No. 3,853,948.

[30] Foreign Application Priority Data
Oct. 4, 1971 Japan.............................. 46-77154

[52] U.S. Cl................ 264/95; 260/880 B; 264/209; 264/210 R; 264/211; 264/289; 264/290 R
[51] Int. Cl.²..................... B29D 7/24; C08F 19/08
[58] Field of Search........ 264/210 R, 209, 289, 290, 264/211, 95; 260/880 B

[56] References Cited
UNITED STATES PATENTS
3,629,387  12/1971  Watanabe et al................... 264/211

FOREIGN PATENTS OR APPLICATIONS
888,624  1/1962  United Kingdom............. 260/880 B

*Primary Examiner*—Jeffery R. Thurlow
*Attorney, Agent, or Firm*—Oblon, Fisher, Spivak, McClelland & Maier

[57] ABSTRACT

A process for producing a film or sheet of a tapered styrenebutadiene copolymer or mixture thereof, which comprises:

melt extruding and then biaxially stretching a tapered styrenebutadiene copolymer with a molecular weight of 40,000 – 250,000, a total styrene content of 50 – 90 wt. %, and a total butadiene content of 40 – 10 wt. %, wherein said tapered styrene-butadiene copolymer contains: (a) more than 5% of the chain portion having a tapering rate of 0.3 – 4 and a styrene content of 30 – 70 wt. %, (b) more than 35% of the chain portion with a styrene content of more than 80 wt. %, and (c) more than 10% of the chain portion with a styrene content from at least 5 wt. % to less than 50 wt. % between high styrene content chain portions which have a styrene content greater than 80 wt. %.

8 Claims, No Drawings

PROCESS FOR PREPARING A FILM OF A TAPERED COPOLYMER OF STYRENE-BUTADIENE OR MIXTURES THEREOF

CROSS-REFERENCE TO RELATED APPLICATIONS

This application is a continuation-in-part of U.S. application Ser. No. 294,832, filed Oct. 4, 1972, now U.S. Pat. No. 3,853,948.

BACKGROUND OF THE INVENTION

1. Field of the Invention

This invention relates to a process for preparing a film of a tapered styrene-butadiene copolymer or mixtures thereof which have a high tear strength and impact strength, and do not form a white mar when the film is bent or torn.

2. Description of the Prior Art

Biaxially oriented polystyrene films have been known which possess a very low impact strength. In order to improve the impact strength of these films high impact polystyrene films fabricated from polystyrene and reinforced with elastomer particles have been prepared. However, these films are opaque or translucent because of the presence of the elastomer particles. In addition, these films form a white mar when they are bent.

SUMMARY OF THE INVENTION

Accordingly, it is an object of this invention to provide a process for preparing a biaxially oriented film of a tapered copolymer of styrene-butadiene or mixtures thereof which has an excellent tear strength and impact strength, and which does not leave a white mar when bent or torn.

Briefly, this object and other objects of this invention as hereinafter will become more readily apparent can be achieved by a process for preparing a film of a tapered copolymer of styrene-butadiene or mixtures thereof by melt extruding and stretching biaxially a tapered styrene-butadiene copolymer with a molecular weight of 40,000 – 250,000, a total styrene content of 50 – 90 wt. %, and a total butadiene content of 40 – 10 wt. %, wherein said tapered styrene-butadiene copolymer contains: (a) more than 5% of the chain portion having a tapering rate of 0.3 – 4 and a styrene content of 30 – 70 wt. %, (b) more than 35% of the chain portion with a styrene content of more than 80 wt. %, and (c) more than 10% of the chain portion with a styrene content from at least 5 wt. % to less than 50 wt. % between high styrene content chain portions which have a styrene content greater than 80 wt. %.

DESCRIPTION OF THE PREFERRED EMBODIMENTS

In the chain of the tapered styrene - butadiene copolymer, the quantity of styrene relative to butadiene continuously changes as shown in the following schematic structure. The reference numerals above the letters b and s designate the ratio of styrene (s) to butadiene (b) (s : b) or butadiene (b) to styrene (s) (b : s).

```
                5 5 5 5 5 4 4 4 4 4 3
              b s b s b s b s b s b s b s b s b s b s-
                          2 2 2 2 2 3 3 3 3 3
  ┌s b s b s b s b s b s b s b s b s b s b s b-┘
  │ 2 2 2 2 2 3 3 3 3 3 3 4 4
  └b s b s b s b s b s b s b s b s b s b s b s-┐
                          5 5 5 5 5 4 4 4
              s b s b s b s b s b s b s b-┘
```

The absence of a numeral above the letters indicate a styrene-butadiene ratio or a butadiene-styrene ratio of 1 : 1. The chain portion with the tapering styrene-butadiene content is indicated by the abbreviation: sb → sb (wherein → indicates the direction of increasing styrene monomer unit content). The chain portions consisting of 100% styrene monomer units and 100% butadiene monomer units are abbreviated as s — s and b — b, respectively. The chain portions containing random styrene and butadiene monomer units (with no tapering units) is abbreviated as sb — sb. Tapering styrene-butadiene copolymer chains can have the following structures, which are only a limited number of the types of combinations possible.

a. s — s — sb → sb → s — s b. s — s — b — b → sb → sb → s — s c. s — s ← sb ← sb → sb → s — s d. s — s ← sb ← sb ← b — b → sb → sb →
   s — s e. sb → sb → s — s — sb → sb → s — s f. sb ← sb → sb g. sb ← sb ← b — b → sb → sb h. sb ← sb — c — sb → sb
              |
            sb → sb i. s — s ← sb ← sb — c — sb → sb — s — s
              |
            sb → sb → s — s

The letter c represents a catalyst which forms a branch in the polymer chain. Preferably, a low content of 1.2 vinyl bond units is maintained in the butadiene units of the micro-structure of the tapered styrene-butadiene copolymer. It is especially preferred to maintain less than 30% 1.2 vinyl bond units to the total butadiene monomer unit content.

The tapered styrene-butadiene copolymer can be prepared by the living anion polymerization method which is disclosed in applicants' copending U.S. patent application Ser. No. 134,391, filed Apr. 15, 1971, now abandoned. The following reactions are typical methods for the preparation of the tapered styrene-butadiene copolymer:

a. s — s — sb → sb → s — s

Styrene is polymerized in the presence of an alkyl lithium catalyst in a non-polar hydrocarbon solvent such as benzene, cyclohexane, n-heptane or toluene. A mixture of butadiene and styrene is charged, after completion of the styrene polymerization reaction. Butadiene can be charged before completion of the styrene polymerization reaction. However, the tapering rate and the length of the tapering portion of the polymer chain are difficult to control by this process. Preferably, butadiene and styrene are separately charged to the reactor in the presence of a randomizer such as tetrahydrofuran, dimethyl ether, diethyl ether, anisole or amines, e.g., triethyl amine in order to control the ratio of butadiene to styrene. This procedure results in control of the length of the tapering portion of the copolymer chain in the styrene-butadiene system.

b. 

Styrene is polymerized in the presence of an alkyl lithium catalyst in a non-polar solvent. Butadiene is initially charged to the reactor after the polymerization of styrene, followed by a second charge of butadiene and styrene. The tapering rate and length of the tapering portion of the copolymer chain can be controlled by changing the rate of addition of butadiene and styrene.

c. 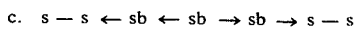

Styrene and butadiene are polymerized in the presence of small amounts of a randomizer which is followed by the addition of styrene to the reactor. The copolymer may also be prepared by charging butadiene and styrene to the reactor in the presence of a dilithium catalyst.

d. 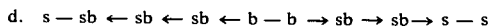

Butadiene is polymerized, and then butadiene and styrene are charged to the reactor to form the tapering portion of the — sb ← sb chain. This is followed by the addition and polymerization of styrene. The copolymer may also be prepared by charging butadiene and styrene to the reactor in the presence of a dilithium catalyst.

e. 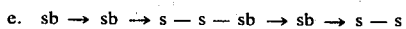

Styrene and butadiene are charged twice to a reactor in the presence of a non-polar hydrocarbon solvent containing an alkyl lithium catalyst. A multi-tapered copolymer can be prepared by repeating this process.

f. 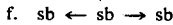

Styrene and butadiene are charged to a reactor in the presence of a non-polar hydrocarbon solvent containing a dilithium catalyst and a small amount of a randomizer. The formation of the copolymer is influenced by control of the ratio of butadiene to styrene charged to the reactor.

g. 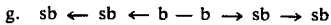

Butadiene is polymerized in a non-polar hydrocarbon solvent containing a dilithium catalyst, and then styrene and butadiene are charged to a reactor in the presence of a small amount of a randomizer while controlling the ratio of styrene and butadiene charged to the reactor. Styrene and butadiene may also be polymerized in the presence of a randomizer and an alkyl lithium catalyst.

h. 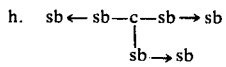

The sb ← sb tapered copolymer is prepared by charging styrene and butadiene to a reactor in the presence of a non-polar hydrocarbon solvent containing a trilithium catalyst and a small amount of a randomizer.

i. 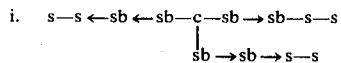

The sb ← sb tapered copolymer is prepared by charging styrene and butadiene to a reactor in the presence of a small amount of a randomizer containing trilithium catalyst.

The amount of block styrene polymer can be measured by decomposing the tapered copolymer in the presence of a t-butyl hydroperoxide and osmium tetrachloride catalyst. The amount of separated block styrene polymer is determined by the following equation:

$$\text{styrene block rate} \quad (\%) = \frac{\text{Separated block styrene polymer (wt.)}}{\text{Total copolymer (wt.)}} \times 100$$

The amount of block styrene polymer can also be measured by infrared spectral measurements at 540 cm$^{-1}$.

The tapering rate of the polymer can be calculated by measuring the conversion rate and the styrene content at certain stages during the copolymerization reaction. The difference in the styrene content at two points in the chain is calculated, and the tapering rate is given by the following equation:

$$\text{Tapering rate} = \frac{\text{Difference in the styrene content at two points in the chain}}{\text{Percentage of the weight of the chain portion to the weight of the total chain}}$$

The structure of the tapered styrene-butadiene copolymer can be confirmed by the calculated tapering rate. The tapered styrene-butadiene copolymer should have a molecular weight of 4,000 – 250,000 (determined by osmometric pressure measurements) in order to have excellent tear strength, and impact strength characteristics, as well as the ability to resist formation of white mar and micro-cracks when the tapered copolymer is processed to form films. (Impact strength means film impact strength). A lower molecular weight results in a copolymer with an inferior impact strength. A higher molecular weight copolymer results in inferior processing of the copolymer, especially as it relates to the formation of the unblown portion in the T-die. In addition, rough surfaces and low transparency arise during the inflation processing of the high molecular weight copolymers. The total styrene content of the tapered copolymer is preferably in the range of 50 – 90 weight percent. A lower styrene content results in a rubber-like product which has no advantages over conventional block copolymers. A styrene content greater than 90 weight percent results in a copolymer with a low impact strength and a copolymer which forms micro-cracks when bent. Preferably, the copolymer chain contains more than 5% of a chain portion which has a tapering rate of 0.3 – 4 and a styrene content of 30–70 weight percent. When the chain portion containing the tapering portion is lower than 5%, the impact strength is too low indicating that the styrene content should be decreased. The resulting film or sheet has a rubber-like property with rough surfaces and low transparency.

The tapered copolymer should contain more than 10% of the chain portion with a styrene content of at least 5% to less than 50 weight percent styrene between the two high styrene content chain portions which have a styrene content greater than 80 weight percent. This is referred to as the specific tapered structure. When a tapered styrene-butadiene copolymer does not possess this specific tapered structure, it has lower impact strength and tear strength. When the tapered styrene-butadiene copolymer possesses the indicated specific tapered structure, it has high impact strength and tear strength.

When the tapered styrene-butadiene copolymer is formed as a film less than 2 mm thick, the film possesses remarkable characteristics such as a remarkable impact strength. The tapered styrene-butadiene copolymer can be formed without adding any plasticizer. Polystyrene may also be added to the tapered copolymer as it is formed into a film. The films and sheets prepared from the tapered styrene-butadiene has all of the characteristics of a styrene film with improvements in transparency and impact strength. In addition, the film of the composition does not form a white mar on bending or impact.

The process by which the films and sheets of the tapered styrene-butadiene copolymer or mixtures thereof of this invention are formed are not limited. These biaxially extending processes which can be applied include known processes such as the inflation method and the tenter method. The film extruded from the extruder in the form of a sheet or tube is stretched with a tenter or by blowing air. The temperature of the film when stretched is in the range of 60°–180°C, preferably 90°–130°C. It is difficult to stretch the extruded film at a temperature less than 60°C. If the film is stretched at a temperature greater than 180°C, the stability of the stretching operation is inferior. When the film is stretched by the inflation method, the tubular film extruded is stretched 1.5 – 25 times, preferably 2 – 5 times in the feeding or longitudinal direction and 1.5 to 8 times, preferably 2 – 5 times in the traversing direction of the extruded film. When the film is stretched by the tenter method, the sheet of film is stretched 1.5 – 8 times, preferably 2 – 5 times in the vertical direction and in the horizontal direction.

The characteristics of the films of the tapered styrene-butadiene copolymer or of the copolymer mixtures with polystyrene are as follows:
1. Excellent transparency and surface luster.
2. High mechanical strength, e.g., film, impact strength, tear strength and bending strength.
3. No white mar or cracks are formed upon bending or impact.
4. No moisture adherence and an excellent water repellency. The film does not change in length when subjected to a change in moisture. It is also dimensionally stable.
5. Suitable moisture and gas permeability.
6. No taste, no smell and no toxicity (no plasticizer is required).
7. Highly resistant to acid, alkali and aliphatic hydrocarbons, e.g., gasoline.
8. Excellent electric characteristics.
9. Excellent secondary processing characteristics (vacuum forming, pressure forming, cold processing, bending, cutting, heat sealing, adhesion, metallizing).
10. The tensile and impact strength do not decrease upon secondary processing with heat.
11. Good printability.
12. Heat shrinkable films can be formed.

The films of this invention can be used for a variety of applications, especially for packaging various foods. The films of this invention can be laminated while retaining their excellent transparency, surface luster and tear strength characteristics.

Having generally described the invention, a further understanding can be obtained by reference to certain specific examples which are provided herein for purposes of illustration only and are not intended to be limiting unless otherwise specified.

EXAMPLE 1

Inflation Method

The tapered styrene-butadiene copolymer shown in Table 1 was processed by the inflation method to form a film. In the process, the molten copolymer was extruded from an annular slit having a 0.5 mm gap and a 40 mm diameter to form a tube having a 150μ thickness and a 98 mm diameter. A specific amount of air was blown into the tube to stretch the film from the center of the die. The tubular film was solidified with cool air from a cooling ring. The ring was then taken up through the guide rollers and knip rollers. The thickness and width of the film were determined by the die pressure, extrusion rate, take-up speed and air blowing rate. Different thicknesses of the films were determined by calibrated positions of the cooling ring. The take-up speed ranged from 3 to 8 m/min and the diameter stretch rate was 2 – 5. Films possessing uniform thickness and high strength were produced by this process. The conditions for the film formation processes are shown in Table 1. The characteristics of the resulting films are shown in Table II.

Table I

|  | Copolymer Type | (Note 1) Type a | (Note 2) Type c |
|---|---|---|---|
| Formula of copolymer | Total styrene Content % (Note 3) | 80.4 | 80.0 |
|  | Number average molecular weight (× 10⁴) (Note 4) | 12.4 | 11.9 |
|  | Styrene block rate (%) (Note 5) | 67.0 | 55.5 |
|  | Amount of chain portion with a tapering rate of 0.3–4 and a styrene content of 30–70 wt.(%) (Note 6) | 11.4 | 19.1 |
|  | Amount of chain portion with more than an 80 wt. (%) styrene content (Note 6) | 70.3 | 64.9 |
|  | Amount of chain portion with | 24.0 | 22.7 |

Table I-continued

| Copolymer Type | (Note 1) Type a | (Note 2) Type c |
|---|---|---|
| less than a 50 wt. (%) styrene content (Note 6) | | |

Note 1 s—s—sb→sb → s—s type block copolymer
Note 2 s—s←sb←sb→sb→s—s type block copolymer
Note 3 Total styrene content was measured by NMR
Note 4 Number average molecular weight was measured by an osmotic pressure method.
Note 5 The amount of styrene block polymer was measured by decomposing the block copolymer with t-butyl hydroperoxide and osmium tetrachloride.
Note 6 The amount of each chain portion to the total chain was measured by the curve of the chain length and the styrene-butadiene ratio which is calculated from the blocking rate from samples taken during the polymerization.

Table II

| | | Type a | | Type c | |
|---|---|---|---|---|---|
| Condition of stretching | Film feeding velocity (m/min) | 8.0 | | 8.0 | |
| | Film temperature (°C) | 130 | | 130 | |
| | Rate of stretch Vertical | 3.5 | | 3.4 | |
| | Rate of stretch Horizontal | 3.5 | | 3.4 | |
| | Heat treatment (temp. time) | 60°C, 15 sec. | | 60°C, 15 sec. | |
| | | Vertical | Horizontal | Vertical | Horizontal |
| Physical properties | Thickness (μ) (Note 7) | 13 | | 14 | |
| | Tensile strength (kg/cm²) (Note 7) | 1.3 | 1.2 | 1.2 | 1.2 |
| | Elongation (%) (Note 7) | 40 | 81 | 43 | 85 |
| | Tear strength (kg/cm²)(Note 8) | 4.5 | 3.3 | 4.3 | 3.1 |
| | Elemendolf tear (g) (Note 9) | 80 | 150 | 78 | 140 |
| | Film impact strength (kg.cm) (Note 10) | 10 | | 9.8 | |
| | Elasticity (kg/cm²) | 5450 | 5070 | 5500 | 5100 |
| | White mar by bending | None | | None | |

Note 7 JIS K-6732
Note 8 JIS P-8116
Note 9 JIS P-8134
Note 10 JIS K-6745

EXAMPLE 2

Biaxial stretching by the tenter method

The tapered styrene-butadiene copolymer shown in Table 1 was processed by the inflation method to form a film. In the process, the molten copolymer was extruded from an annular slit having a 90 mm diameter (L/D = 29) under temperature conditions of the extruder of 160°–220°C. The temperature of the die was 210°C and the film was extruded at a rate of about 50 kg/hour to form a sheet having a thickness of 0.8 mm. The tapered styrene-butadiene copolymer obtained is shown in Example 1. The characteristics of the resulting films are shown in Table III.

Table III

| Copolymer | | Type a | | Type c | |
|---|---|---|---|---|---|
| Condition of stretching | Film feeding velocity (m/min) | 5 | | 5 | |
| | Film temperature (°C) | 115 | | 115 | |
| | Rate of stretching (Vertical × Horizontal) | 3.0 × 3.0 | | 3.0 × 3.0 | |
| | | Vertical | Horizontal | Vertical | Horizontal |
| Physical properties | Thickness (μ) | 26 | | 24 | |
| | Tensile strength (kg/mm²) | 2.8 | | 2.9 | |
| | Elongation (%) | 32 | | 30 | |
| | Tear strength (kg/mm²) | 3.6 | | 3.5 | |
| | Elemendolf tear (g) | 80 | | 78 | |
| | Film impact strength (kg.cm) | 9.4 | | 9.1 | |
| | Elasticity (kg/cm²) | 10830 | | 10510 | |
| | White mar by bending | None | | None | |

EXAMPLE 3

The tapered styrene-butadiene copolymer shown in Table IV and a polystyrene resin composition were blended and the mixture was biaxially stretched by the tenter method. The conditions of the tests were the same as those of Example 2. The characteristics of the resulting films are shown in Table V.

Table IV

| Copolymer | (Note 1) Type a | (Note 2) Type c |
|---|---|---|
| Total styrene content wt.(%) | 60 | 60 |
| Number average molecular weight $\times 10^4$ | 7.9 | 7.7 |
| Styrene block rate (%) | 51 | 38 |
| Amount of chain portion with a tapering rate of 0.3–4 and a styrene content of 30–70 wt.(%) | 49 | 60 |
| Amount of chain portion with more than an 80 wt. (%) styrene content | 51 | 45 |
| Amount of chain portion with less than a 50 wt. (%) styrene content | 47 | 53 |

Note 1 s—s—sb—→sb—→s—s type block copolymer.
Note 2 s—s←—sb←—sb—→sb—→s—s type block copolymer.

Table V

| Formula | Formula of polymers | Polystyrene:Type a 1 : 1 | Polystyrene:Type c 1 : 1 |
|---|---|---|---|
| Formula of composition | Styrene content (%) | 80 | 80 |
| Stretching Conditions | Film feeding velocity (m/min) | 4 | 4 |
| | Film temperature (°C) | 120 | 120 |
| | Rate of stretch (Vertical × Horizontal) | 3.0 | 3.0 |
| Physical properties | THickness ($\mu$) | 15 | 14 |
| | Elongation (%) | 21 | 25 |
| | Tear strength (kg/mm$^2$) | 4.6 | 4.7 |
| | Elemendolf tear (g) | 24 | 26 |
| | Film impact strength (kg.cm) | 12 | 11 |
| | Elasticity (kg/cm$^2$) | 14,100 | 14,500 |
| | White mar bending | None | None |

Having now fully described the invention, it will be apparent to one of ordinary skill in the art that many changes and modifications can be made thereto without departing from the spirit or scope of the invention as set forth herein.

What is claimed as new and intended to be covered by Letters Patent of the United States is:

1. A process for producing a film or sheet of a tapered styrene-butadiene copolymer which comprises:
    melt extruding and then biaxially stretching at a temperature in the range of 60° – 180°C a tapered styrene-butadiene copolymer with a molecular weight of 40,000 – 250,000, a total styrene content of 50 – 90 wt. %, and a total butadiene content of 40 – 10 wt. %, wherein said tapered styrene-butadiene copolymer contains: (a) more than 5% of a chain portion with a tapering rate of 0.3 – 5 and a styrene content of 30 – 70 wt. %, (b) more than 35% of a chain portion with a styrene content of more than 80 wt. %, and (c) more than 10% of a chain portion with a styrene content from at least 5 wt. % to less than 50 wt. % between two high styrene content chain portions which have a styrene content greater than 80 wt. %.

2. The process of claim 1, wherein said melt-extruding and stretching is conducted by the inflation method whereby a bi-axial orientation is imparted to the tapered copolymer.

3. The process of claim 2, wherein said tapered copolymer is stretched by a factor of 1.5 – 25 times in the longitudinal direction of the extruded polymer and by a factor of 1.5 – 8 times in the traversing direction of the extruded polymer.

4. The process of claim 1, wherein said tapered styrene-butadiene copolymer is admixed with polystyrene together with an anti-oxidant and the mixture is melt-extruded and stretched by an inflation method.

5. The process of claim 1, wherein said tapered styrene-butadiene copolymer is prepared from a living polymer prepared in the presence of a lithium type catalyst.

6. The process of claim 1, wherein said tapered styrene-butadiene copolymer is prepared by polymerizing styrene and butadiene in the presence of a randomizer and a lithium type catalyst in a non-polar solvent.

7. The process of claim 1, wherein said melt extruding and stretching is conducted by the tenter method to produce a biaxially oriented tapered copolymer.

8. The process of claim 7, wherein said tapered copolymer is stretched by a factor of 1.5 – 8 times in the longitudinal and traversing directions of the extruded polymer.

* * * * *